United States Patent [19]

Burgard

[11] Patent Number: 4,636,125
[45] Date of Patent: Jan. 13, 1987

[54] MOUNTING DEVICE AND METHOD OF USE

[76] Inventor: Francis A. Burgard, 12800 W. Cleveland Ave., New Berlin, Wis. 53151

[21] Appl. No.: 676,482

[22] Filed: Nov. 29, 1984

[51] Int. Cl.$^4$ .............................................. F16B 15/00
[52] U.S. Cl. .................................... 411/389; 411/410; 411/435
[58] Field of Search ............... 411/107, 374, 387, 388, 411/389, 396, 397, 402, 409, 410, 435, 513, 530; 10/86 W

[56] References Cited

U.S. PATENT DOCUMENTS

| | | | |
|---|---|---|---|
| 1,078,007 | 11/1913 | Stange | 411/389 |
| 2,435,466 | 2/1948 | Thomas | 411/389 |
| 3,563,131 | 2/1971 | Ridley, Sr. | 411/384 |
| 4,266,460 | 5/1981 | Klimowicz | 411/397 |
| 4,536,115 | 8/1985 | Helderman | 411/397 |

FOREIGN PATENT DOCUMENTS

| | | | |
|---|---|---|---|
| 756524 | 9/1933 | France | 411/397 |
| 1270449 | 7/1961 | France | 411/409 |
| 19265 | of 1908 | United Kingdom | 411/387 |
| 654181 | 6/1951 | United Kingdom | 411/388 |

*Primary Examiner*—Gary L. Smith
*Assistant Examiner*—Neill Wilson
*Attorney, Agent, or Firm*—Bayard H. Michael

[57] ABSTRACT

The mounting device has an elongated body having a wood screw on one end and a (machine screw) threaded hole at its other end. The drift pin mounted in the cross bore provides a handle for screwing the body into a tree or post. The body at said other end has a hexagonal exterior enabling use of a wrench to screw the device into the tree. When the device is mounted in a tree an archer can transfer the container of a "trailer" from his bow to the device, thus freeing the archer to do other things while waiting for his prey to die.

1 Claim, 4 Drawing Figures

U.S. Patent  Jan. 13, 1987  4,636,125
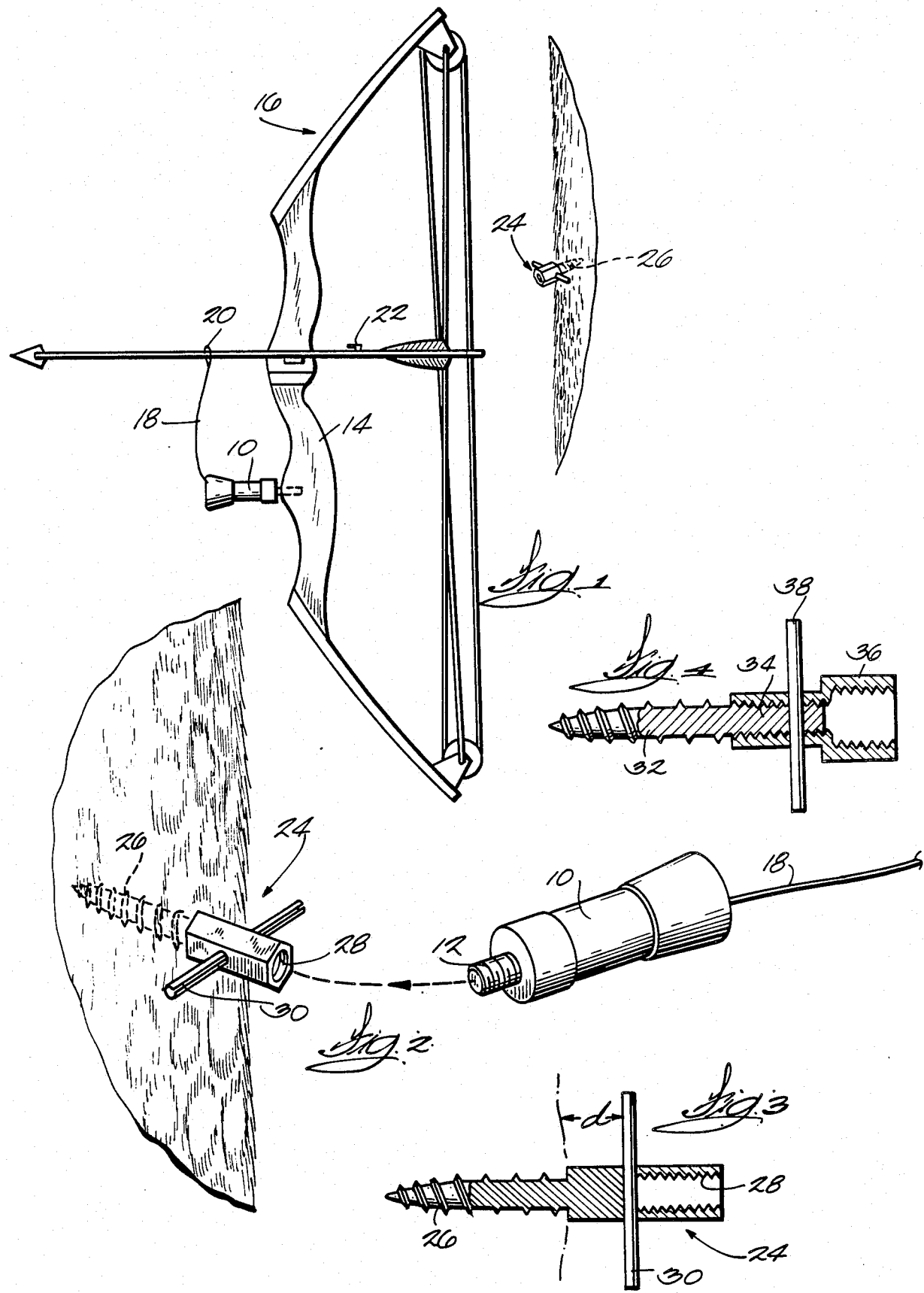

MOUNTING DEVICE AND METHOD OF USE

BACKGROUND OF THE INVENTION

Many archers use "trailers" when hunting (particularly deer hunting) to facilitate tracking the game after a hit which is not immediately fatal. A trailer is a brightly colored, light weight, very strong line which is attached to the arrow and pulled off a spool as the animal flees. The idea is to let the animal stop soon (do not pursue right away) so it can lie down and die through loss of blood. After a discreet wait, the archer simply follows the line to his prey. The spool is enclosed in a drum or container which is mounted on the riser section of the bow by threading a spud into the usual threaded boss provided for mounting a stabilizer bar. For various reasons, the archer may not want to wait while the deer dies. He may want to go in for lunch or it may be getting dark and require return at dawn. With the prior art apparatus, all the archer can do under such circumstances is to remove the drum from the bow and leave it, hoping to find it on his return and hoping the line can run free if the deer moves; otherwise the line can break and he has lost the trailer and the deer.

SUMMARY OF THE INVENTION

An object of this invention is to provide a mounting device which can be threaded into a tree and has a (machine threaded) bore into which the trailer drum or container can be threaded. This enables placing the drum in clear sight and where the line can feed out cleanly. Handle means are provided to afford a manual grip to facilitate screwing the device into the tree.

Another object is to provide the mount with a hex (or square) body enabling use of a wrench to screw the mount into the tree.

BRIEF DESCRIPTION OF THE DRAWINGS

FIG. 1 is a side elevation of an archery bow provided with a trailer device connected to the shaft of the arrow. In the background, simply for pictorial purposes, there is shown the mounting device screwed into a tree trunk.

FIG. 2 is an enlarged perspective view showing the mounting device threaded into a tree trunk and depicting the manner in which the drum or housing of the trailer is screwed into the end of the mounting device.

FIG. 3 is a horizontal section showing the manner in which the drift pin/handle is mounted in a cross bore in the device.

FIG. 4 shows a modified form enabling replacement of the wood screw if it is damaged.

DETAILED DESCRIPTION OF THE DRAWINGS

FIG. 1 shows the general arrangement for mounting a trailer on a compound bow. The trailer itself has a housing or container 10 which includes a stud 12 having a machine thread thereon which can thread into the (machine threaded) blind hole customarily provided in the riser section 14 of the compound bow 16 to permit an archer to mount a stabilizing bar if he so desires. This is a simple and convenient way to mount the container 10 for the trailer line 18 which is tied to provide a loop 20 which is placed over the shaft of the arrow. The arrow is modified to provide a hook-like device 22 to pick up the loop as the arrow is shot. Thus, as the arrow is cast the hook comes along and picks up the loop and starts peeling line from the spool within the container 10. There are various other trailer arrangements.

As previously indicated, there are occasions when the hit on the deer is not as clean as may be desired, and the deer starts to run. If the archer doesn't chase the deer, the deer will shortly stop to "nurse its wound" and at this time, if left alone, the deer will, in all likelihood, die from loss of blood. Therefore, it behooves the archer to wait while the deer settles down and dies peacefully. But the archer doesn't like to have to just sit there waiting for the inevitable. If he unscrews the container 10 and just leaves it on the ground, he stands a very good chance of not finding it again and, therefore, of not being able to follow the trailer line to the deer. If the deer does move on, the line can very readily become snagged in the brush and break, causing the archer to lose his prey and thus resulting in the needless death of a deer.

With the mounting device shown in small scale in FIG. 1 and in larger scale in FIGS. 2 and 3, the archer is allowed freedom to move around. Thus, he takes the mounting device 24 and threads the wood screw (threaded) end 26 into a tree. The other end of the body of the mounting device is provided with an internally threaded (machine thread) hole 28 into which the stud 12 projecting from the container 10 can be threaded. This permits the container to be fixed high enough to be readily seen and to be clear of the surrounding brush to enable the line to be pulled from the spool inside the container if the deer should decide to move along.

The body of the mounting device 24 is provided with a cross bore into which a drift pin 30 is inserted to function as a handle enabling the archer to turn the screw 26 into the tree trunk. The cross bore is at the bottom of, or just beyond, the end of the threaded hole 28. This way it does not interfere with mounting the container and the spud can be turned in to its full depth. The distance between the drift pin and the shoulder at the inner end of the screw thread 26 should be adequate to permit finger clearance so the archer can turn the mounting device into the tree without skinning his knuckles.

The body is also provided with a hexagonal exterior at least over the distance from the drift pin 30 to the end of the body. This enables the archer to use a small wrench to screw the mounting device into the tree. This will give better leverage than the drift pin.

The mounting device 24 is a unitary device. If the screw 26 is bent, the entire device must be replaced. The embodiment shown in FIG. 4 has a separate wood screw 32 having a threaded end 34 onto which the internally threaded adapter 36 is turned until the cross bore 36 in the adapter lines up with the cross bore in the end 34. The roll pin 38 is then inserted. Now if the wood screw 32 is damaged or bent, it can be replaced. The adapter 36 has a hexagonal exterior. The end of adapter 36 which threads onto the screw has a smaller diameter hole than the other end which receives the standard stud 12. Wood screws having the (machine) threaded end can be purchased "off the shelf" (without the cross bore) but if of the same size as the spud they are too difficult to turn into a tree or post. Therefore the two bore sizes are used.

I claim:

1. A mounting device for affixing to a tree or the like a member having a machine threaded mounting stud, said device having an elongated body having an externally threaded wood screw at one end and a blind hole at its other end,
  machine threads on the interior of said blind hole, and
  handle means fixed to said body to facilitate fixing said body on a tree or the like,
  said body having two parts, one part including said wood screw and a threaded end, the other part being an adapter threaded onto said threaded end and including said machine threads,
  a cross bore in each of said parts,
  said handle means comprising a pin through said cross bores in said parts to retain the parts connected while functioning as a handle.

* * * * *